Nov. 5, 1968   C. B. KREKELER   3,409,331
MINING MACHINE ROTARY CUTTER BAR
Filed Jan. 5, 1968   3 Sheets-Sheet 1

INVENTOR
CLAUDE B. KREKELER,
BY *Yungblut, Melville, Strasser and Foster*
ATTORNEYS

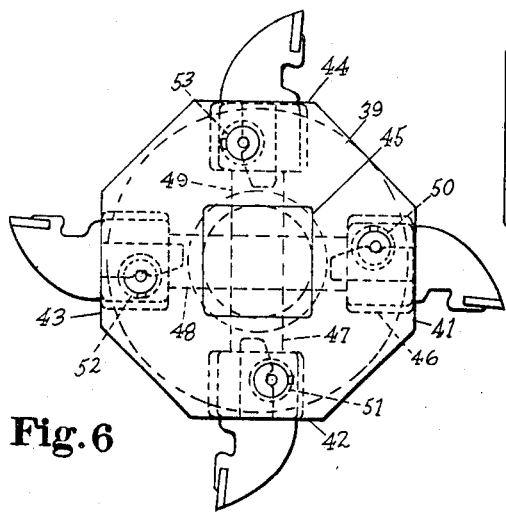
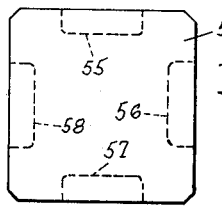
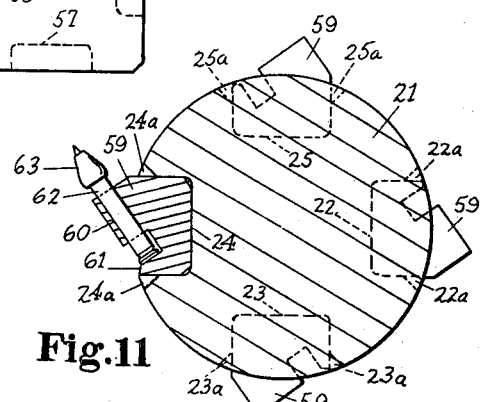
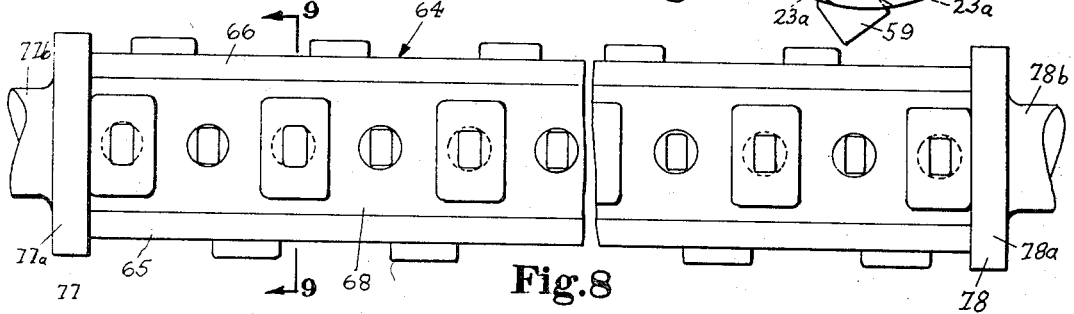
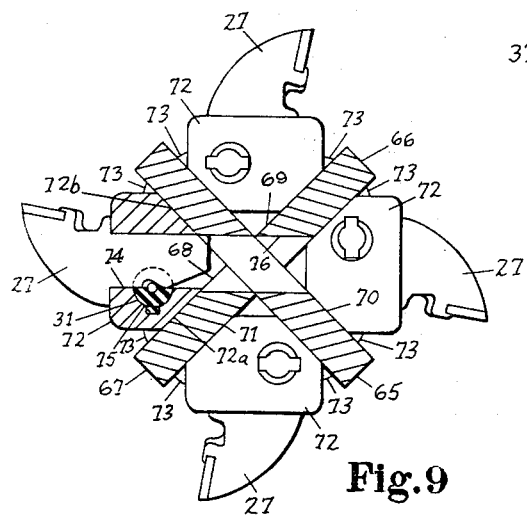
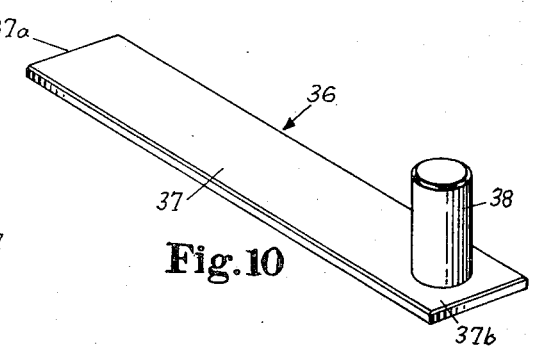

Nov. 5, 1968  C. B. KREKELER  3,409,331
MINING MACHINE ROTARY CUTTER BAR
Filed Jan. 5, 1968  3 Sheets-Sheet 3
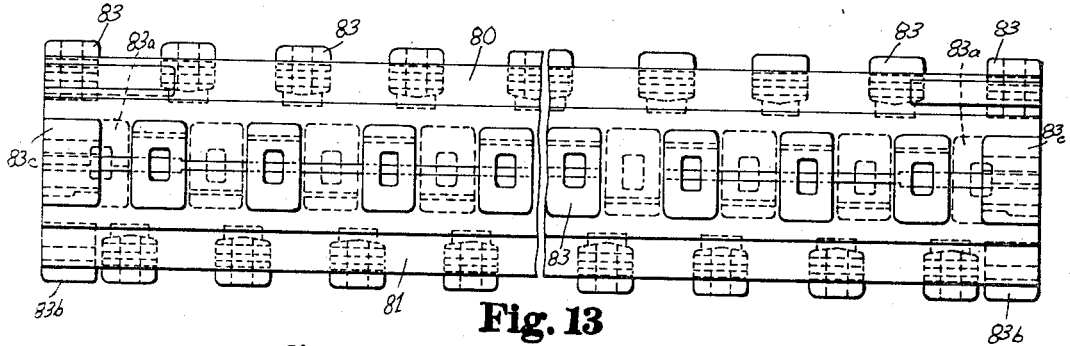
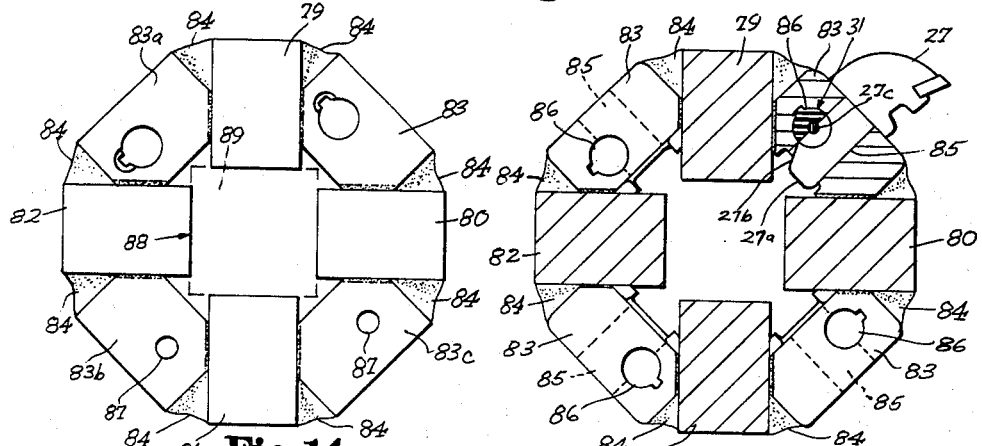
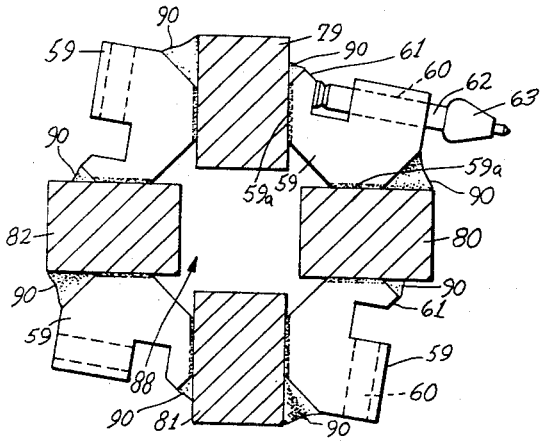
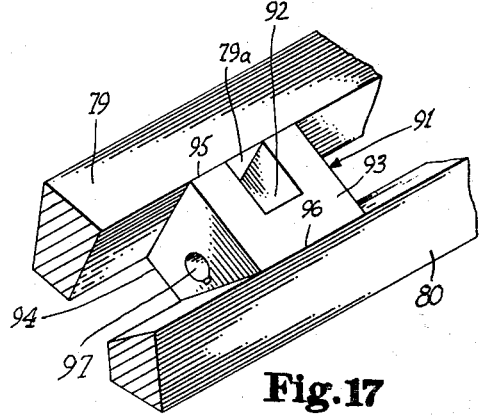
INVENTOR/S
CLAUDE B. KREKELER,
BY *Melville, Strasser, Foster and Hoffman*
ATTORNEYS

United States Patent Office 3,409,331
Patented Nov. 5, 1968

3,409,331
MINING MACHINE ROTARY CUTTER BAR
Claude B. Krekeler, Cincinnati, Ohio, assignor to The Cincinnati Mine Machinery Co., Cincinnati, Ohio, a corporation of Ohio
Continuation-in-part of application Ser. No. 555,140, June 3, 1966. This application Jan. 5, 1968, Ser. No. 701,523
22 Claims. (Cl. 299—89)

ABSTRACT OF THE DISCLOSURE

A rotary cutter bar for a continuous mining machine or the like, which comprises at least one elongated body member providing a plurality of spaced surfaces extending the length thereof. A plurality of lugs are located between and affixed to adjacent ones of the spaced surfaces, and are adapted to receive the shanks of cutter bits.

CROSS-REFERENCE TO RELATED APPLICATIONS

This is a continuation-in-part of the copending application of the same inventor, Ser. No. 555,140, filed June 3, 1966, now abandoned and entitled, Improvements in Continuous Mining Machines.

BACKGROUND OF THE INVENTION

(1) *Field of invention*

This invention relates to improvements in continuous mining machines and more particularly to improvements in rotary cutter bars therefor.

(2) *Description of the prior art*

Wherever possible, present day coal mining operations make use of self-propelled continuous mining machines. Boring type continuous mining machines generally perform the steps of cutting into the face of a coal seam, thereby making their own passageway, and loading the coal on conveyor means. The most frequently encountered machines of this type have a plurality of interdigitating rotary cutter arms which make a cut in the form of two or more overlapping circles in side-by-side relationship. These machines are also provided with cutting means mounted behind the rotary cutter arms and which make an upper and lower cut transforming the two or more overlapping side-by-side circular cuts into one larger cut of generally oval configuration. The elongated portions of the oval cut form the roof and the floor of the mine entry.

The cutting means behind the rotary cutter arms has usually taken the form of a continuous cutter chain provided with cutter bits and socket members therefor. The continuous cutter chain or trim chain passes about a series of sprockets in such a way that there are upper and lower flights of the chain which make the above mentioned upper and lower cuts.

A trim chain of the type described has a number of disadvantages. Such a trim chain is made up of a plurality of parts and is subject to breakage. Under some circumstances excessive packing of coal cuttings and foreign material may occur about the sprocket wheels. Often this packing can be sufficiently severe to cause the trim chain to be disengaged from the sprocket teeth, or to produce breakage in the apparatus.

In recent years, continuous boring-type mining machines have been made with rotary cutter bars or drums located behind the rotary cutter arms in approximately the same position as above mentioned upper and lower flights of a trim chain. In general, such rotary cutter bars or drums are made of metal stock of round cross section with a plurality of lugs or socket members welded thereto. In order to obtain sufficient strength, the diameter of the round stock from which the cutter bar is made must be relatively large, and the lugs which are affixed about its periphery must be of relatively large and heavy construction. This results in a large bit circle (i.e., the circle described by the cutting tip of the bit). The larger the bit circle, the more work the cutter bars must perform and the more power is required to rotate them. In order to reduce the bit circle, bits of shorter gauge have been used but this tends to interfere with the flow of material cut by the cutter bar. The cutter bits are generally of the replaceable type, having shanks entering into perforations in the socket members. These shank receiving perforations are open at one end only, and an accumulation of cuttings and fines therein often makes bit replacement difficult.

Accordingly, the present invention teaches the provision of improved cutter bars having recessed lugs or socket members, whereby the lugs are mechanically held in addition to welding, and the lugs themselves may be of a lighter construction. Furthermore, the lugs or socket members have shank receiving perforations therein which are not blind. The rotary cutter bars of the present invention are such that a smaller bit circle can be achieved and at the same time bits of longer gauge may be used whereby the flow of cut material is improved. It is thus possible, for example, to provide a rotary cutter bar utilizing the same cutter bits as are used on other portions of the continuous mining machine. The rotary cutter bars of the present invention are characterized by great strength, relatively small bit circles and require a minimum of power for their operation. The cutter bits may be easily and rapidly changed, and the lugs may be adapted to utilize a particular type of resilient cutter bit retaining means, as described hereinafter.

SUMMARY OF THE INVENTION

The rotary cutter bars of the present invention are intended for use in various types of well known continuous mining machines. The rotary cutter bars are intended to be supported at their ends and caused to rotate against the material being mined so as to cut therethrough.

In one embodiment, the cutter bar comprises an elongated cylindrical element provided with a plurality of longitudinally extending grooves spaced about its periphery. Each groove provides a pair of spaced surfaces between which lugs or socket members are located. The lugs are held in place by any suitable means such as welding or the like. Each lug is provided with a perforation adapted to receive the shank of a cutter bit.

A second embodiment of the rotary cutter bar of the present invention comprises a first elongated plate and second and third elongated plates affixed to opposite sides of the first plate. The three plates form an elongated element having an X-shaped cross sectional configuration, the legs of which are of equal length. The spaces between adjacent legs comprise V-shaped notches extending the length of the rotary cutter bar. Lug members are located in the V-shaped notches and are affixed to the surfaces of adjacent legs. It is within the scope of the invention to form rotary cutter bars, in similar manner, with three or more elongated plates so as to form three or more V-shaped notches.

In a third embodiment, a plurality of elongated members are held together in spaced relationship by lugs located between and affixed to adjacent surfaces of the elongated members.

The lugs of any of the embodiments of the present invention may be arranged in any suitable manner. They are preferably arranged in two helices extending from the ends of the cutter bar to its center, so as to aid in directing the flow of cut material to a conveyor means at the center of the mining machine. The ends of the rotary cutter bars of the present invention may be provided with shafts, or means to receive shafts so that they may be appropriately connected to the support and driving means of the mining machine.

BRIEF DESCRIPTION OF THE DRAWINGS

FIG. 5 is a diagram showing the relative placement of the cutter bit-socket member assemblies on the rotary cutter bar of the present invention.

FIG. 6 is an end elevation of the cutter bar of the present invention as seen from the left in FIG. 3.

FIG. 7 is an end elevation of the tongue of the driving means for the rotary cutter bar of the present invention.

FIG. 8 is a fragmentary elevation of a second embodiment of the cutter bar of the present invention.

FIG. 9 is a cross sectional view taken along the section line 9—9 of FIG. 8.

FIG. 10 is a perspective view of a tool used in the installation and removal of resilient cutter bit retaining means in the rotary cutter bar of the present invention.

FIG. 11 is a cross sectional view similar to FIG. 4 and showing the use of a different type of cutter bit-socket member assembly.

FIG. 13 is a fragmentary elevation of a third embodiment of the cutter bar of the present invention.

FIG. 14 is an end elevation of the cutter bar of FIG. 13 illustrating in broken lines the position of the tongue of the driving means for the rotary cutter bar.

FIG. 15 is a cross sectional view of the rotary cutter bar of FIG. 13, showing a cutter bit and retaining means positioned in one of the socket members.

FIG. 16 is a cross sectional view, similar to FIG. 15, and showing the use of a different type of cutter bit-socket member assembly.

FIG. 17 is a fragmentary perspective view of the cutter bar of FIG. 13 illustrating the use of another type of socket member.

DESCRIPTION OF THE PREFERRED EMBODIMENTS

Figure 1:
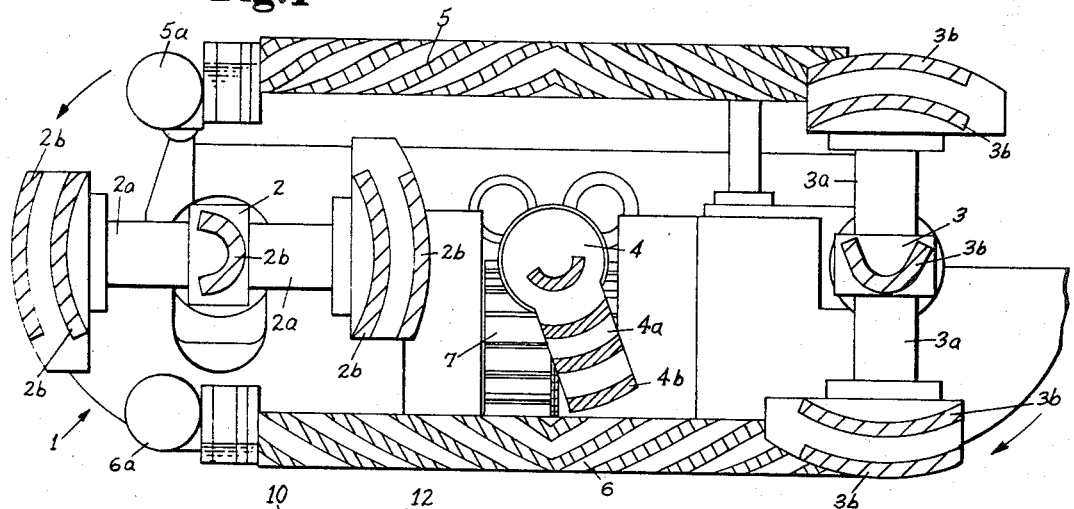
FIG. 1 is a semi-diagrammatic front elevation of a continuous mining machine illustrating the various cutting means thereon.

It will be understood by one skilled in the art that the improved means of the present invention may be employed with various types of well known continuous mining machines. For the purpose of an exemplary showing these means are described with reference to that type of continuous mining machine characterized by interdigitating rotary cutter arms. FIG. 1 is a diagrammatic front or head end view of a continuous mining machine generally indicated at 1. Rotary cutting means 2, 3 and 4 are provided with interdigitating cutter arms 2a, 3a and 4a respectively. These arms have a plurality of cutting means indicated at 2b, 3b and 4b respectively. The cutting means generally consist of socket members of lugs attached to the arms and adapted to hold cutter bits which can be replaced when worn, all as is well known in the art.

The machine 1 is also provided with upper and lower rotary cutter bars 5 and 6. One end of each of the rotary cutter bars is supported by suitable bearing means not shown. The other end of each cutter bar is joined to means for imparting rotation to the cutter bar. The rotation imparting means are diagrammatically indicated at 5a and 6a.

The central portion of the machine is provided with conveyor means generally indicated at 7 for carrying coal away from the cut to another conveyor means (not shown) located behind the machine.

Figure 2:
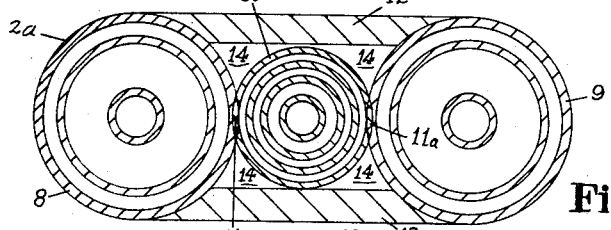
FIG. 2 is a diagrammatic representation of the cuts made by the interdigitating rotary cutter arms and the rotary cutter bars of the mining machine of FIG. 1 and illustrating the cores left thereby.

FIG. 2 is a diagrammatic representation of the various cuts made by the machine of FIG. 1 in the face of the material being mined. The series of concentric circles generally indicated at 8, 9 and 10 illustrate the cuts made by the cutter bits mounted in socket members on the rotating cutter arms 2a, 3a and 4a respectively. It will be noted that the outermost ones of the concentric circles 8, 9 and 10 overlap in the areas generally indicated at 11 and 11a. The horizontal band 12 represents the cut made by the upper rotating cutter bar 5. The horizontal band 13 represents the cut made by the lower rotary cutter bar 6. It will be noted that the cutting actions thus far described leave cores generally indicated at 14 which will be broken off and removed by additional means on the machine (not shown).

Figure 2A:
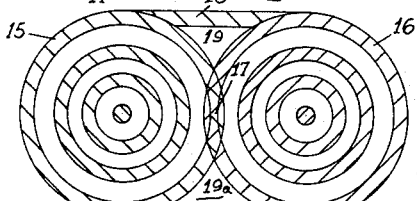
FIG. 2a is a diagrammatic representation of the cuts made by a mining machine having two interdigitating rotary cutter arms and rotary cutter bars, and illustrating the cores left thereby.

FIG. 2a is a diagrammatic representation of the various cuts made by a mining machine similar to that of FIG. 1, but having only two interdigitating rotary cutter arms. The series of concentric circles generally indicated at 15 and 16 represent the cuts made by the two interdigitating rotary cutter arms. The outermost ones of the circles 15 and 16 overlap as at 17. Cutter bars located behind the rotary cutter arms make upper and lower cuts 18 and 18a, leaving upper and lower cores 19 and 19a. Means (not shown) are provided on the machine to break up the cores 19 and 19a.

It is the rotary cutter bars making the cuts 12 and 13 in FIG. 2 or 18 and 18a in FIG. 2a with which the present invention is concerned, and it will be understood that the cutter bars such as 5 and 6 in FIG. 2 can be substantially identical in their construction.

Figure 3:
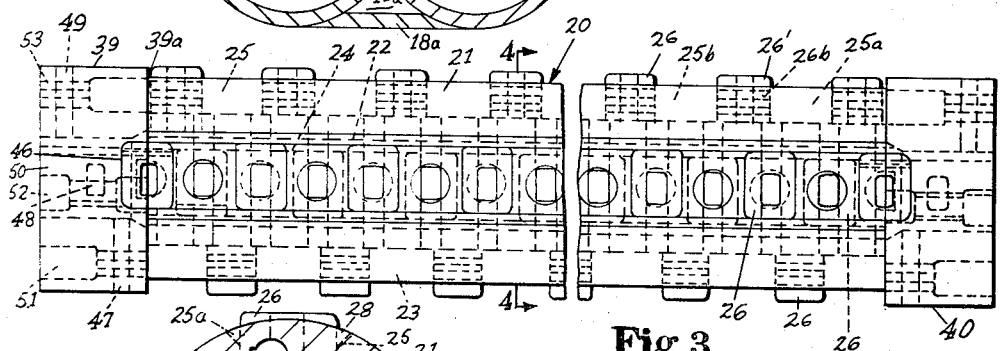
FIG. 3 is a fragmentary elevational view of the rotary cutter bar of the present invention.
Figure 4:
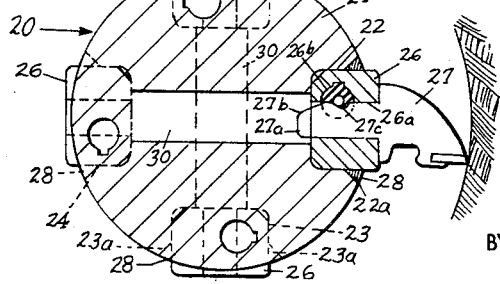
FIG. 4 is a cross sectional view taken along the section line 4—4 of FIG. 3 and illustrates a cutter bit positioned in one of the lugs.

One embodiment of the rotary cutter bar of the present invention is shown in FIGS. 3–6. The cutter bar itself (generally indicated at 20) is made up of an elongated piece of metallic round stock. The elongated element 21 is provided with a plurality of longitudinally extending grooves spaced about its periphery. While the number of such grooves does not constitute a limitation on the present invention, it has been found satisfactory to provide four of them as shown at 22–25. For purposes of an exemplary showing the grooves 22–25 are illustrated as being substantially rectangular in cross section, presenting parallel spaced side surfaces slightly relieved at their outer edges as at 22a–25a. The grooves 22–25 are adapted to receive a plurality of identical socket members or lugs. Each lug 26 is of rectangular configuration having a shank receiving perforation 26a. As shown in FIG. 4, the shank 27a of a cutter bit 27 is adapted to extend into the lug perforation 26a and to be held therein by means described hereinafter. The lugs 26 are so dimensioned as to have a relatively close fit within the grooves 22–25, with only a small portion of each lug extending beyond the periphery of the elongated element 21. The lugs are held in place by any suitable means such as welds 28 preferably at the positions of the reliefs 22a–25a.

It will be understood by one skilled in the art that the reliefs 22a–25a do not constitute a limitation on the present invention and that the grooves 22–25 may have any appropriate cross sectional configuration to accommodate a lug of any particular external shape.

FIG. 5 is a flat diagram indicating the relative positions of the lug-cutter bit assemblies. As indicated, the four longitudinal lines represent the grooves 22–25, and the dots 29 represent the lug-cutter bit assemblies. While the arrangement of the cutter bit-lug assemblies is not so limited, it is preferred that they be arranged about the periphery of the elongated element 21 in the form of two helices extending from the ends of the element 21 to its center, the helices being of opposite hand. Such an arrangement tends to direct the flow of cut material toward the center of the mining machine to the conveyor 7.

It will be noted from FIGS. 3 and 4 that the element 21 has a plurality of transverse perforations 30 passing therethrough and coaxial with the shank receiving perforations 26a in each of the lug members 26. In this way, the shank receiving perforations are not blind, and the cutter bits 27 may be replaced quickly and easily without the difficulties normally encountered when the shank receiving perforations 26a are blind and filled with fines and other foreign material.

The bits 27 may be held in place in the lugs or socket members by any suitable means. An advantage of the structure of the present invention lies in the fact that a resilient bit holding means may be used similar to that shown in U.S. Letters Patent No. 2,965,365 dated Dec. 20, 1960, in the name of the present inventor. To this end, each lug 26 is provided with a transverse hole 26b which partially intersects the shank receiving perforation 26a. The hole 26b is adapted to receive a resilient holding device (generally indicated at 31 in FIG. 12) comprising a metallic rod 32 encased in a body of resilient substance 33. The resilient body is cut away as at 34 to expose that portion of the rod 32 which traverses the shank receiving perforation 26a. The resilient retainer 31 may, if desired, be provided with a cage-like element 35 of metal which forms, inter alia, a key. When such a cage-like element or key is provided, the hole 26b will be broached to accept the key as hitherto understood in the art. When a resilient retainer of the type described (or any type which is positioned within the lug by means of a transverse hole therein) is used, the lugs 26 in any one of the grooves 22–25 will be spaced from each other by a distance sufficient to permit insertion of the retainer in the transverse hole from at least one side of the lug.

The rear portion of the shank 27a of the cutter bit 27 has a relieved portion 27b and a notch 27c. As described in the above mentioned patent, when the bit shank 27a is inserted in the shank receiving perforation 26a, the relieved portion 27b of the bit shank will depress the metal rod 32 until it can enter the shank groove 27c, after which the bit shank will be firmly held in the socket member. The cutter bit can be removed for replacement purposes by means of a suitable prying tool acting upon the head thereof. The notch 27c is so configured as to cause the pin 32 to be depressed until it is dislodged from the notch 27c.

Figure 12:
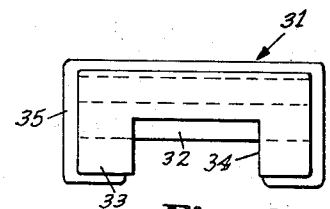
FIG. 12 is a plan view of a type of resilient retaining means which may be used in association with the cutter bar of the present invention.

FIG. 10 illustrates an exemplary tool for use in the insertion and removal of a resilient retaining means of the type shown in FIG. 12. The tool, generally indicated at 36, comprises a flat elongated handle 37 having ends 37a and 37b. Near the end 37b, a laterally extending lug 38 is affixed to the handle 37 by any suitable means such as welding or the like. The lug 38 may be cylindrical in configuration and of a diameter such that it may be received in the transverse hole 26b of a lug 26. When the lugs in any given one of the grooves 22–25 are spaced from each other as described above, sufficient room is thereby provided to enable a resilient retainer 31 to be started in a transverse lug hole 26b by hand. To illustrate, it will be noted that the lug indicated at 26' in FIG. 3 is located in the groove 25 in the element 21. The groove 25 is unoccupied on either side of the lug 26' as at 25a and 25b. Thus, a resilient retainer 31 may be started by hand in the transverse hole 26b, the remainder of the resilient retainer extending into the space 25a. The end 37a of the tool 36 may then be inserted in the space 25a against the resilient retainer. Lateral blows to the tool handle 37 will cause the retainer 31 to be driven home.

When the resilient retainer in the lug 26' is to be removed, the end 37b of the tool 36 may be placed in the space 25a with the free end of the lug 38 positioned against the end of the resilient retainer. Lateral blows on the handle 37 will cause the lug 38 to enter the transverse hole 26b and will cause the resilient retainer to be driven out of the transverse hole 26b into the space 25b in the groove 25.

The ends of the elongated elements 21 may have adapters 39 and 40 permanently affixed thereto. The adapters 39 and 40 constitute means for receiving the ends of supporting shafts, one at least of which imparts rotation to the cutter bar. The adapter 39 is clearly shown in FIGS. 3 and 6, and it will be understood that the adapter 40 is a mirror image thereof. While not so limited, the adapter may have about its periphery a series of flat surfaces located adjacent to and equal in number to the number of longitudinal grooves in the element 21. Since, in the exemplary embodiment, the cutter bar is illustrated as having four grooves 22–25, the adapter has four flat surfaces 41–44. These surfaces lie in the same planes defined by the upper surfaces of the lugs 26 in the grooves 22–25 respectively. The adapter also has a central perforation 45 of noncircular cross section and coaxial with the axis of the elongated element 21. The perforation 45 is adapted to receive the tongue or shaft of a driving element such as those shown at 10 and 11 in FIG. 1. The adapter 40 is provided with a similar perforation, adapted to receive a shaft or tongue cooperating with the supporting bearing means on the mining machine at the other end of the cutter bar. The face 39a of the adapter, to which the end of the elongated member 21 is permanently affixed, has formed therein appropriately shaped recesses to receive one-half of the endmost lug in the groove 22, and to form one-half of the transverse perforation associated therewith. These recesses are generally indicated at 46 in FIGS. 3 and 6. The adapter is also provided with perforations 47, 48 and 49 extending respectively from the srufaces 42, 43 and 44 to the central perforation 45. The perforations 47, 48 and 49 are appropriately spaced and configured to serve as shank receiving perforations for additional cutter bits, so that the cutter bar is provided with cutter bits throughout its length including the adapters 39 and 40.

As shown in FIGS. 3 and 6, the adapter has a series of transverse holes 50–53. The hole 50 communicates with the transverse hole 26b in the aforementioned endmost lug 26 in the groove 22. The remaining holes 51, 52 and 53 partially intersect the perforations 47, 48 and 49 in the adapter and are configured to receive resilient retaining means 31 therefor. It will be noted, particularly from FIG. 3, that the holes 51, 52 and 53 in the areas of the perforations 47, 48 and 49 respectively are of substantially the same size and configuration as the transverse holes 26b in the lugs 26. The remainder of each of the holes 51, 52 and 53 are of an enlarged diameter whereby insertion and removal of resilient retaining means therein is rendered easier.

While the length and diameter of the elongated element 21 do not constitute a limitation on the present invention, it will be understood from the foregoing description that by virtue of the recessing of the lugs 26 in grooves in the element 21, a cutter bar having a desired bit circle may be provided using conventional cutter bits 27 and characterized by great strength. The recessing of the lugs 26 also permits them to be of lighter construction and less welding is required to affix them to the element 21 since they are mechanically held in the longitudinal grooves 22–25. The use of conventional bits having a relatively long gauge produces coarser cuttings, aids in the flow of cut material toward the mining machine conveyor 7, and facilitates the feeding of the mining machine into the face of the material being cut. The cutter bar of the present invention has, by virtue of its structure, the further advantage of the capability of using the resilient retainers such as those of the above mentioned patent which makes bit replacement a relatively quick and simple process of the knock-in, pry-out type.

The cutter bars of the present invention may be made of any desired diameter, and the size of the cutter bars does not constitute a limitation. However, as a non-limiting example, heretofore it has been common when a cutter bar having a bit circle of twelve inches was desired to start out with an elongated piece of metallic round stock of six inch diameter to which lugs were welded. It was often necessary to provide specially sized cutter bits of shorter gauge in order to attain the twelve inch bit circle. In a cutter bar of the present invention, having a bit circle of twelve inches, the element 21 may be made of eight inch diameter round stock, and conventional cutter bits may be used, being the same bits as are used elsewhere on the cutting elements of the mining machine.

For a given strength factor, the structure of the present invention permits the manufacture of a rotary cutting bar having a bit circle smaller than heretofore possible, and still utilizing conventional cutter bits. It will be evident from FIG. 6 that if the cutter bar illustrated were of a smaller diameter, and adapted to use the same conventional bits 27, the bit shanks 27a would extend partially into the central perforation 45 of the adapter. FIG. 7 is an end elevation of the tongue or shaft 54 which is received in the adapter perforation 45. If the diameter of the cutter bar is such that the cutter bit shanks extend into the perforation 45, the shaft 54 may be provided with an appropriate number of longitudinal grooves (indicated in dotted lines at 55–58) to accommodate them.

FIG. 11 is a cross sectional view (similar to FIG. 4) of the rotary cutter bar of the present invention illustrating the use of a lug-cutter bit assembly of the type described in the copending case of the same inventor, Serial No. 611,513, filed Dec. 19, 1966, and entitled, cutter bits and means for mounting them.

In FIG. 11 like parts have been given like index numerals. The elongated element 21 again has longitudinally extending grooves 22–25 relieved at their outer edges as at 22a–25a. The element 21 may be substantially identical to that shown in FIG. 4 except that there is in this embodiment no need for the transverse perforations 30.

In this embodiment lugs 59 are so configured as to have a relatively close fit in the grooves 22–25, and are permanently affixed therein as by welding at 22a–25a. As described in the above identified copending application, the lugs 59 have a shank receiving perforation 60 and an abutment means 61 in association with the rear face of the lug. A surface portion of the abutment means 61 extends across and parallel to the rear surface of the lug. The abutment surface also extends transverse the axis of the shank receiving perforation and is spaced from the rearward opening of the perforation. The shank receiving perforation 60 may be a simple cylindrical bore. As illustrated, a cutter bit holder 62 having a cylindrical shank of substantially the same diameter throughout its length is adapted to be received within the perforation 60. The rearward end of the cutter bit holder will contact the abutment surface of the element 61 which serves as a gauge determining means for the shank. The forward end of the cutter bit holder has a conical cutter bit 63 removably affixed thereto. As is described in the copending application, a cutter bit having a cylindrical shank and a conical nose may be used instead of the cutter bit-cutter bit holder assembly illustrated in FIG. 11. As is further described, a number of different types of retaining means (not shown), including the type described above, may be provided for preventing the shank of the cutter bit or cutter bit holder and bit assembly from being removed from the lug perforation 60.

FIGS. 8 and 9 show another embodiment of the rotary cutter bar of the present invention. In this instance, the elongated member (generally indicated at 64) which supports the lug-cutter bit assemblies, comprises a plate 65 and additional plates 66 and 67 affixed to opposite sides of the plate 65 along its axis. As is most clearly shown in FIG. 9, the elongated element 64 has a X-shaped cross sectional configuration, the legs of which are of equal length. The spaces between adjacent legs comprise V-shaped notches or slots 68–71 which extend the full length of the element 64. The notches 68–71 are adapted to receive lugs 72, which are similar to the lugs 26 of FIGS. 3 and 4, but are relieved as at 72a and 72b so as to fit properly within the notches. The lugs 72 may be affixed to the element 64 in any suitable manner such as by welds 73. The relative placement of the lugs 72 on the element 64 may be substantially the same as the placement of the lugs 26 on the element 20 (see FIGS. 3 and 5). The distance between adjacent lugs in any one of the notches 68–71 may be as above described. Each lug 72 may have a shank receiving perforation 74 and a transverse hole 75 similar to the shank receiving perforation 26a and transverse hole 26b of the lugs 26 of FIGS. 3 and 4. The lugs 72 (while not so limited) may use the same cutter bit and resilient retaining means as described with respect to FIGS. 3 and 4, and like parts have been given like index numerals. The manner in which the bits 27 may be inserted and removed from the perforation 74 of the lug 72 is the same as described above, and the same is true for the insertion and removal of resilient retaining means 31. Insertion and removal of the resilient retaining means 31 may be accomplished by means of the tool 36 as described above.

The elongated element 64 will be provided with a plurality of transverse perforations 76 at the position of the shank receiving perforation 74 of each of the lugs 72. The transverse perforations 76 serve the same purpose as the transverse perforations 30 in the elongated element 21. The rotary cutter bar of FIGS. 8 and 9 may be provided with adapters similar to those shown at 39 and 40 in FIGS. 3 and 6. As illustrated in FIG. 8, however, more simplified adapters 77 and 78 may also be used. The adapters 77 and 78 are identical and comprise respectively metallic discs 77a and 78a permanently affixed to the elongated element 64 and having integral shafts 77b and 78b. One of the shafts 77b or 78b will be supported in suitable bearing means, while the other will be coupled to suitable drive means.

It will be understood by one skilled in the art that the embodiment of the rotary cutter bar of the present invention shown in FIGS. 8 and 9 will have all of the advantages described with respect to the embodiment of FIGS. 3–6. It will be further understood that the lug-cutter bit assemblies of FIG. 11 may also be used on the cutter bar of FIGS. 8 and 9 if the lugs 59 are provided with suitable reliefs to make them conform properly to V-shaped notches 68–71.

It is within the scope of the invention to form a rotary cutter bar similar to that shown in FIGS. 8 and 9 but having a Y-shaped cross sectional configuration. In this instance, the plates 65, 66 and 67 will be of equal width and will be joined together in such a way that a longitudinal edge of each plate will lie substantially along the long axis of the cutter bar. In addition, more than three elongated plates may be so joined, or more than one plate (such as plate 66 or 67 in FIG. 9) may be joined to the sides of plate 65 so as to form a rotary cutter bar having any desired number of longitudinaly extending V-shaped notches for the receipt of lugs.

FIGS. 13–16 illustrate a third embodiment of the rotary cutter bar of the present invention. In this instance, the rotary cutter bar comprises a plurality of elongated structural members joined together and maintained in spaced relationship with respect to each other by a plurality of lugs. While not so limited, for purposes of an exemplary showing this embodiment is illustrated as comprising four elongated structural members 79–82. The structural members 79–82 may have a rectangular cross section, and are joined together by a plurality of lugs 83. This is most clearly shown in the cross sectional view of FIG. 15.

The lugs 83 may be of any suitable type, and may be similar to the lugs 26 of FIGS. 3 and 4, and substantially identical to lugs 72 of FIG. 9. The bottom corners 83a and 83b of the lugs will be relieved so as to conform to the surfaces of adjacent ones of the structural members 79–82.

The lugs and the structural members may be joined in any suitable manner, such as by welds 84, to form a unitary structure. Again, the relative placement of the lugs 83 with respect to each other may take any suitable form, and preferably may be substantially the same as the placement of the lugs 26 on the element 20 (see FIGS. 3 and 5).

The distance between adjacent ones of the lugs 83, located between adjacent ones of the structural members 79–82, may be the same as described above with respect to FIGS. 3–6. Each lug 83 may have a shank receiving perforation 85 and a transverse hole 86, similar to the shank receiving perforation 26a and transverse hole 26b of the lugs 26 of FIGS. 3 and 4. The lugs 83 (while not so limited) may use the same cutter bit and resilient retaining means as described with respect to FIGS. 3 and 4. This is illustrated in FIG. 15, and like parts have been given like index numerals.

The manner in which the bits 27 may be inserted and removed from the perforations 85 of the lugs 83 is the same as described above, and the same is true for the insertion and removal of the resilient retaining means 31. Again, insertion and removal of the resilient retaining means may be accomplished by a tool such as that described with respect to FIG. 10.

While the invention is not intended to be so limited, it is often desirable to provide a lug between each of the structural members 79–82 at the ends of the cutter bar. If the lugs are uniformly arranged about the periphery of the assembly, no difficulty is encountered. When, however, the lugs are affixed between the structural members in a helical fashion, the arrangement of the lugs at the ends of the rotary cutter bar will be as illustrated in FIGS. 13 and 14.

In such an instance, one lug 83, similar to the lugs used throughout the length of the cutter bar, will be located at the end thereof. The next lug 83a will have to be extended (as shown in FIG. 13) in order to continue the helical pattern. The remaining two lugs 83b and 83c will be "dummy" lugs. The dummy lugs 83b and 83c will not have a shank receiving perforation and will not be intended to carry a cutter bit. These last mentioned lugs will, however, have transverse perforations 87 by which access may be had to the transverse perforations in adjacent lugs. In other words, the perforations 87 are similar in purpose to the hole 50 in the adapter 39 of FIGS. 3 and 6.

The rotary cutter bar of FIGS. 13–16 may be provided with any suitable type of adapter such as those shown, for example, at 77 and 78 in FIG. 8. One advantage of the construction of the embodiment of FIGS. 13–16, however, is that no adapter need be provided. It will be noted from FIG. 14, that the structural members 79–82 define a four-sided hole located centrally of and extending throughout the length of the rotary cutter bar. The hole is generally indicated at 88. The hole 88 is adapted to receive the tongue or shaft of a bearing means or a driving element, indicated in dotted lines at 89. Similarly, shaft elements (not shown) may be inserted into the hole 88 at both ends of the rotary cutter bar and may be affixed therein by any suitable means such as welding or the like. Such shaft elements may be adapted to connect with a bearing means at one end of the cutter bar and a driving element at the other end of the cutter bar.

Should a cutter bit 27 be used, having a shank 27a of such length as to interfere with a shaft in the perforation 88, the shaft may be appropriately relieved in much the same manner as described with respect to FIG. 7. In this instance, however, the edges of the shaft rather than the side surfaces would be relieved.

FIG. 16 is a cross sectional view of the rotary cutter bar of FIG. 13 illustrating the use of the lug-cutter bit assembly of the above mentioned copending application. The lug-cutter bit assemblies are substantially identical to those shown in FIG. 11 and like parts have been given like index numerals. It will be noted that the lugs 59 are provided with suitable reliefs 59a to make them conform to the surfaces of adjacent ones of the structural elements 79–82. The lugs will be joined to the structural elements by any suitable means such as welds 90.

In the embodiment of FIG. 16, when it is desired to have four lug elements at the ends of the cutter bar, one of the lugs may be the same as those used throughout the length of the cutter bar. Two of the lugs may be "dummy" lugs, and the fourth lugs may be extended in width. In other words, the arrangement will be substantially the same as that described with respect to FIGS. 13 and 14.

The rotary cutter bar of FIGS. 13–16 will have all of the advantages described with respect to the embodiment of FIG. 3 and the embodiment of FIG. 8. In addition, the cutter bar of FIGS. 13–16 requires no drilling, planing or the like in its assembly. It is within the scope of the invention to make the lugs of high grade alloy material, to insure excellent strength characteristics of the cutter bar.

FIG. 17 is a fragmentary perspective view of a cutter bar of the type shown in FIGS. 13–16 and illustrates another type of lug or socket member. The lug, generally indicated at 91, is characterized by a transverse, U-shaped cross sectional configuration. The U-shaped cross section is the result of a notch 92 in one face of the lug extending from the lug top 93 through the lug bottom 94. The notched face 95 of the lug is affixed by welding or the like to the structural member 79 of the rotary cutter bar. The opposite face 96 of the lug is affixed to the adjacent structural member 80.

As will be evident from FIG. 17, when the lug 91 is positioned between the structural elements 79 and 80, the side surface 79a of the structural element 79 will enclose the notch 92 so as to form a shank receiving perforation into which the shank of a cutter bit may be inserted. The lug 91 may also have a transverse hole 97, partially intersecting the notch 92 and adapted to receive a resilient retaining means for maintaining the shank of a cutter bit in the shank receiving notch or perforation 92. The retaining means may be of any suitable type including that described with respect to FIG. 12.

It will be understood by one skilled in the art that the lug 91 may be used in any of the embodiments of the rotary cutter bar of the present invention. For example, the lug 91 may be suitably configured for use in cutter bars of the type shown in FIGS. 3 and 8.

Since the lug 91 utilizes a part of the cutter bar itself to complete the shank receiving perforation, the lug may be made smaller and still accommodate conventional cutter bit means. As a result, use of lugs such as lug 91 enables the achievement of a smaller bit circle, or the provision of more longitudinally extending lug receiving notches in the cutter bar, or both.

Modifications may be made in the invention without departing from the spirit of it. For example, the elongated element 21 of the cutter bar of FIGS. 3 and 4 may have the grooves 22–25 so machined therein as to follow helical paths about its periphery. Furthermore, the elongated element 21 of FIGS. 3 and 4 may be made up of two or more parts. These parts may be welded end-to-end to form a unitary cutter bar. In being welded end-to-end the various parts may be turned through a small angle with respect to each other so that the longitudinal grooves of the parts will lie in different peripheral positions.

It is within the scope of the invention to provide the adapters 39 and 40 of FIGS. 3 and 6 with integral shaft means, eliminating the central shaft receiving perforation 45. Alternatively, the embodiment shown in FIG. 3 may be provided with adapters of the type shown at 77 and 78 in FIG. 8.

The embodiments of the invention in which an exclusive property or priviledge is claimed are defined as follows:

1. A rotary cutter bar for a continuous mining machine and the like, having a longitudinally extending axis of rotation and comprising at least one elongated body member providing a plurality of pairs of spaced surfaces extending the length thereof, a plurality of lugs being located in spaced relationship to each other between the spaced surfaces of each of said pairs and affixed therebetween to said body member, each of said lugs having means for the attachment of a cutter bit thereto.

2. The structure claimed in claim 1 including a plurality of elongated body elements spaced equidistant from each other and equidistant from said axis, each of said elements having two side surfaces, said pairs of spaced surfaces comprising a side surface of each of two adjacent ones of said body elements, said lugs located between adjacent ones of said body elements and affixed to said spaced surfaces of said pairs whereby to join said body elements together.

3. The structure claimed in claim 1 wherein said lugs are spaced about the periphery of said elongated body member in such a way as to form two helices of opposite hand starting from the ends of said elongated body and meeting at the middle thereof.

4. The structure claimed in claim 1 including means affixed to the ends of said elongated body adapted to receive driving and supporting shafts associated with the mining machine and each the like, said means having have a central shaft receiving perforation, said perforation being coaxial with said axis of rotation.

5. The structure claimed in claim 1 including means affixed to the ends of said elongated body, each of said means having an outwardly extending shaft coaxial with said axis of rotation.

6. The structure claimed in claim 1 wherein each of said lugs comprises a body having a pair of surfaces lying adjacent said spaced surfaces between which said lug is located, one of said lug surfaces having a notch therein, said notch and a portion of the adjacent one of said spaced surfaces forming a perforation adapted to receive the shank of a cutter bit means.

7. The structure claimed in claim 1 wherein said elongated body member comprises a cylindrical element, said cylindrical element having a plurality of grooves extending inwardly from the periphery thereof and extending the length thereof, said grooves forming said pairs of spaced surfaces, said lugs being affixed to said body member partially within said grooves, said lugs being proportioned with respect to said grooves as to be in part at least mechanically held therein.

8. The structure claimed in claim 7 wherein each of said lugs has perforation adapted to receive the shank of a cutter bit means, said shank receiving perforation extending through said lug and being unobstructed at both ends, said elongated body member having a plurality of transverse holes coaxial with the shank receiving perforations of said lugs.

9. The structure claimed in claim 1 wherein said elongated body member has an X-shaped cross section, the outermost ends of the legs of said X-shaped cross section being equidistant from said axis of rotation, each of said legs having two side surfaces, said pairs of spaced surfaces comprising a side surface of each of two adjacent ones of said legs of said X-shaped cross section, said lugs being located between and affixed to said spaced surfaces of said pairs.

10. The structure claimed in claim 9 wherein each of said lugs has a perforation adapted to receive the shank of a cutter bit means, said shank receiving perforation extending through said lug and being unobstructed at both ends, said elongated body member having a plurality of transverse holes coaxial with the shank receiving perforation of said lugs.

11. The structure claimed in claim 1 including a plurality of elongated body members joined together to form a unitary structure having a plurality of longitudinally extending notches therein, each of said notches having surfaces comprising one of said pairs of spaced surfaces.

12. The structure claimed in claim 11 wherein said lugs located between said spaced surfaces of said pairs are affixed to said surfaces.

13. The structure claimed in claim 1 including a plurality of cutter bit means, each of said cutter bit means having a shank, each of said shanks located within a shank receiving perforation of one of said lugs, and means for retaining said shanks in said perforations.

14. The structure claimed in claim 13 wherein said retaining means comprise resilient retaining means whereby the engagement of said shanks in said perforations may be of the knock-in, pry-out type.

15. The structure claimed in claim 13 wherein the shank of each of said cutter bit means has a notch therein, each of said lugs has a hole extending transversely of said shank receiving perforation and intersecting it, said retaining means comprising a resilient body extending in said hole, said body having an engagement means located at least partially within said perforation, said engagement means being resiliently displaceable transversely of the axis of said perforation and being engageable and disengagable with said notch in said shank.

16. The structure claimed in claim 13 wherein the shank of each of said cutter bit means has a notch therein, each of said lugs has a hole extending transversely of said shank receiving perforation and intersecting it, said retaining means comprising a pin extending in said hole across said perforation so that at least a part of the central portion of said pin is located within said perforation, the end portions of said pin located beyond said perforation being mounted within said hole in surrounding bodies of rubbery resilient substance so that the central portion of said pin is resiliently displaceable transversely of its axis within said perforation and is engageable and disengagable with said notch in said shank, said lugs located between each of said pairs of spaced surfaces being spaced from each other by a distance greater than the length of said retaining means, and said elongated body having a plurality of transverse holes coaxial with said shank receiving perforation of said lugs.

17. The structure claimed in claim 1 wherein each of said lugs has a perforation adapted to receive the shank of a cutter bit means, said shank receiving perforation extending through a part at least of said lug and being unobstructed at both ends.

18. The structure claimed in claim 17 wherein said elongated body member has a plurality of transverse holes coaxial with said shank receiving perforations of said lugs.

19. The structure claimed in claim 17 wherein each of said lugs has a hole extending transversely of said shank receiving perforation and intersecting it, said lugs located between a given one of said pairs of surfaces being spaced from each other by a distance sufficent to permit access to said transverse holes.

20. The structure claimed in claim 17 wherein each of said lugs comprises a body portion and an abutment portion, said body portion having a forward surface and a rearward surface, said shank receiving perforation extending through said body portion and forming openings in said forward and rearward surfaces, said abutment portion being spaced rearwardly of said body portion and overlying a part at least of said shank receiving perforation, said abutment portion having an abutment surface thereon for the end of the shank of a cutter bit means, said abutment surface facing said opening in said rearward surface of said body portion and lying perpendicular to the axis of said perforation.

21. The structure claimed in claim 17 including means in association with each of said lugs for retaining the shank of a cutter bit means in said shank receiving perforation.

22. The structure claimed in claim 17 including means affixed to said cutter bar adapted to receive rotatable shafts associated with the mining machine and the like, said means comprising adapaters having bodies with end surfaces, one end surface of each adapter being permanently affixed to an end of said elongated body member, each adapter having a central shaft receiving perforation coaxial with the axis of said elongated body member, the periphery of each adapter having a plurality of shank receiving perforations extending from said periphery to said shaft receiving perforation, each adapter having a plurality of holes extending from one end surface to the other, each of said holes extending transversely of one of said shank receiving perforations and intersecting it.

References Cited

UNITED STATES PATENTS

| | | | |
|---|---|---|---|
| 1,473,498 | 11/1923 | Morgan | 299—89 X |
| 2,700,189 | 1/1955 | Mick | 299—89 X |
| 8,823,023 | 2/1958 | Hlinsky | 299—87 X |

FOREIGN PATENTS 856,226  12/1960  Great Britain.

ERNEST R. PURSER, *Primary Examiner.*